United States Patent [19]
Corley

[11] Patent Number: 5,964,262
[45] Date of Patent: Oct. 12, 1999

[54] TREELENGTH PROCESSOR

[75] Inventor: Frank W. Corley, Greenville, Ala.

[73] Assignee: Union Camp Corporation, Princeton, N.J.

[21] Appl. No.: 09/016,513

[22] Filed: Jan. 30, 1998

Related U.S. Application Data

[60] Provisional application No. 60/036,034, Jan. 31, 1997.

[51] Int. Cl.$^6$ ................................................. A01G 23/08
[52] U.S. Cl. ...................... 144/4.1; 144/24.13; 144/335; 144/336; 144/343
[58] Field of Search ................................. 144/4.1, 24.13, 144/335, 336, 343

[56] References Cited

U.S. PATENT DOCUMENTS

| | | |
|---|---|---|
| 3,443,611 | 5/1969 | Jörgensen . |
| 3,515,185 | 6/1970 | Wehr et al. . |
| 3,587,682 | 6/1971 | Bromwell ................................. 144/4.1 |
| 3,618,647 | 11/1971 | Stuart, Jr. . |
| 3,623,521 | 11/1971 | Shields . |
| 3,768,529 | 10/1973 | McColl ..................................... 144/4.1 |
| 3,797,541 | 3/1974 | Kurelek et al. ........................... 144/4.1 |
| 3,856,060 | 12/1974 | Savage et al. ........................... 144/336 |
| 3,911,982 | 10/1975 | Ervin et al. .............................. 144/335 |
| 4,114,666 | 9/1978 | Bruun . |
| 4,354,539 | 10/1982 | Propst ...................................... 144/4.1 |
| 4,593,732 | 6/1986 | Ericsson ................................ 144/24.13 |
| 4,838,328 | 6/1989 | Herolf ..................................... 144/336 |
| 4,919,175 | 4/1990 | Samson . |
| 5,107,912 | 4/1992 | Côté, et al. . |

*Primary Examiner*—W. Donald Bray
*Attorney, Agent, or Firm*—Watov & Kipnes, P.C.

[57] ABSTRACT

A treelength processor which tops and delimbs trees by processing from the top of the tree toward the bottom. The treelength processor operates from fellerbuncher piles and processes close to the stumps so that residual material is relatively easily distributed in the forest away from the loading area and substantial reduction in skidder use and chain saw activity is achieved.

9 Claims, 2 Drawing Sheets

TREELENGTH PROCESSOR

This application claims benefit of Provisional Appl. 60/036,034, filed Jan. 31, 1997.

BACKGROUND OF THE INVENTION

The invention is generally directed to a treelength processor for processing a tree which has been felled by a fellerbuncher and, in particular, to a treelength processor which will process a felled tree at or near where the tree has been felled from the top down.

The logging industry and, in particular, the southern United States logging industry has been under increasing pressure to perform in an environmentally sound and silviculturally beneficial manner. Improvements in these areas, without increasing costs, are critical to the future of the logging and forestry industries.

In the past, the delimbing function associated with logging has been mechanized more slowly than any other part of the southern treelength harvesting system. This slow mechanization has now begun to evolve more quickly as the apparent need for improved topping and delimbing equipment has been felt. This is because the delimbing methods influence the cost of the wood fibers and wood products reaching the paper mills and saw mills and they evaluate their raw material costs. It also affects nutrient cycling in farmed forests, soil compaction and erosion, the operability of the logging operation, aesthetics and the safety of the people working in the logging operations which are historically dangerous jobs.

Various different types of timber harvesting systems exist in the Southeast, each of which have various advantages and disadvantages. Generally, three main systems are utilized for timber harvesting in the Southeast. Approximately 92% of the timber harvested in the Southeast uses a treelength system. The other two main systems for harvesting are a chipping system and a cut-to-length system.

Chipping systems are usually separated into two categories: whole tree and flail debarking. In both cases drive to tree fellerbunchers and grapple skidders are used to fell and transport the trees to a chipping area (landing). A whole tree chipping system chips stems without delimbing, topping or debarking. The leading application for this system is in uneven aged low value hardwood. In uneven aged hardwood more useable fiber is captured with the whole tree chipping system than with any other system. During the oil crises of the 1970's there was interest in using whole tree chipping for fuel. However, low fuel values and low prices for fossil fuels have made most fuel wood operations economically unfeasible and they are on the decline.

Perhaps the largest limiting factor for the growth of this type of a system is that most mill processes cannot process barky chips and for the few that can, it is usually only the hardwood part of their operation that can accept this.

Flail debarking and chipping operations are similar to whole tree systems, but stems are debarked to produce clean chips. The flail has revolving chains that strike the stems with enough force to remove bark and limbs and break out tops. The stem is then shipped. This system is most often used in pine first thinning operations. It can handle small stems more efficiently than any other system that produces clean chips and is capable of producing a very high quality chip.

One negative aspect of flail systems is the landing area management problem. Compared to other harvesting systems, those that use flail debarking produce more residual fiber and more concentrated piles, and these piles are in the landing area. Very large landings are required to accommodate all of the operations that take place there.

Most mills are designed for only a limited volume of off-site produced chips. This alone will limit the growth of chip harvesting methods as considerable changes in mill wood yards would be required to accommodate this harvesting approach. Although saw logs may be separated out and produced, chip jobs are usually considered costly and inefficient merchandisers of saw log material. This limits the systems to pulpwood harvest.

Generally, chip operations are capable of producing the most volume of processing, although capital investment is the highest of any of the different systems, often as much as $2,500,000, which makes high production necessary to recapture and amortize the cost of the equipment. A first thinning operation utilizing a chip system may cover over 20 acres per day. This substantially limits the use of these systems to large tracts. Chip inventory methods are not as flexible as round wood inventory. As reliance on chip harvest production increases, wet weather harvesting limitations are potentially more problematic.

While chip operations can produce acceptable silvicultural results, as compared to other systems, however, they are often the worst silvicultural performers. Many problems result from the large scale of the system and the high production requirements. The number of machine interactions is high, traffic, or the number of passes over the same area, is also high, and the level of concentrated activity is high. Management of the system is complex and requires continuous response to changing situations. This creates an environment that tends to sacrifice silvicultural priorities. Many observers view whole tree chipping operations as low cost compared to other methods. However, for the comparison to be correct, the costs of fiber should be carried through to the pulp mill digester. In its proper application, large tracts of uneven aged, natural hardwood, whole tree chip systems are very cost effective and will recover more fiber than any other method. Similarly, flail debarking and chipping operations have proven cost effective approaches when harvesting small trees. This comparison should also be carried through to the digester. However, round wood operations are generally more cost effective in average and large stem harvests. In large tracts of pine with small piece size, flail debarking and chipping operations may be cost effective producers. The differences in volume recovered from flail and treelength operations when harvesting pine are negligible. The flail debarking and chipping operations in hardwoods are a relatively new undertaking. In even aged hardwoods with small tops it is reasonable to expect cost, productivity and yield similar to pine. Uneven aged hardwoods will likely have cost and lower productivity levels. However, as compared to conventional treelength processing, the volume recovered may be higher when uneven aged hardwoods are flailed and chipped.

Based on the above it is reasonable to conclude that there will continue to be a niche for chipping systems. Their application will generally be limited to a specialized portion of industrial forest harvest operations. Thus, even though the application of chipping systems is expanding, without a major technical breakthrough they are unlikely to displace a significant part of current treelength operations. Currently, chipping operations only account for about 4% of the timber harvested in the southeast United States as compared to approximately 92% for treelength systems.

Cut-to-length harvesting systems are used for only an insignificant portion of the current harvest in the southeastern United States, generally, about 0.5%. However, they are the most common system in many other parts of the world and widely promoted as the solution to many current harvesting problems. These systems have been promoted in the United States for over 25 years without any real success. The technology continues to improve through developments in other parts of the world.

There are several different configurations, each with its own applications. The most promoted configuration, a two machine system utilizing a harvester and a forwarder is discussed. A harvester is a machine that fells and processes the tree. During processing, the trees are delimbed, topped and bucked into different products. The forwarder is used to transport the wood to roadside where it is either loaded onto trucks or placed in inventory. Most cut-to-length systems utilize only two people and two machines in the field. This smaller, lower production combination is less influenced by small tracts and is not as hindered by frequent moves due to weather.

Since trees are processed near the stump, the limbs and tops are scattered throughout the stand of trees. Residual fiber can then be utilized as nutrient material and as a buffer between the soil and equipment. This minimizes ground impact and, in the case of selective harvest, protects tree roots. Since forwarders have less area requirements than skidders, only a few small landing areas are needed. Forwarders have larger payloads than skidders and this allows them to economically travel further distances from stump to roadside, reducing the amount of truck haulroads needed. Larger payloads also correspond to fewer trips, resulting in less rutting, soil compactions and residual tree damage in selective cuts. Forwarder systems are the only systems which can effectively inventory wood roadside. This inventory method is more cost effective than conventional wood yards because less handling is involved and shrinkage occurs before transportation. Increased inventory options improve silvicultural performance by decreasing the pressure to run the in woods part of the operation during wet times. Off-the-shelf technology available allows precision merchandising of logs. Cut logs may be sent directly to the correct location. For example, the pure pulpwood portion of the chip-n-saw tree goes directly to the paper mill. This greatly reduces transportation and handling costs as compared to treelength systems.

It is important to note that the cut-to-length system has high fixed costs in the nature of capital investment as a percentage of per unit wood cost than any other system. As a result, it is more sensitive to down time problems. Accurate cost comparisons can only be made when the entire delivery system is considered. For example, comparison on the basis of direct harvesting costs don't take into account the additional transportation and handling involved when treelength wood is sent to sawmills. In general, when direct harvesting costs are compared, the types of cut-to-length systems being employed today are very cost effective in second thinnings. They tend to be more costly than flail chipping systems in first thinnings and more costly than treelength in final harvest.

While cut-to-length systems provide an opportunity to solve many current harvesting problems, several obstacles are likely to prevent the system from displacing treelength processing, at least in the short term.

Current mill wood yards are designed for treelength wood. While the required changes to convert to cut-to-length processing lumber is not as significant as with chip harvesting methods, there are still substantial problems associated with this. In a sense, it is a chicken and egg problem. Harvesting systems and mill wood yards co-evolved together to treelength processing. It would be necessary to change both the harvesting system and the mill wood yards together for cut-to-length to be competitive. Sawmills have invested heavily in technology to merchandize treelength stems at the mill. While many of the systems are able to handle cut-to-length lumber, but the culture and investment continues to support treelength processing. Most harvesting developments are reached by introducing new technology on a piecemeal basis, most often a single new machine into an existing system. To introduce cut-to-length harvesting contractors would need to change all of their existing machines. Cut-to-length has a number of advantages, most are silvicultural and aesthetic. Some limited growth may continue, but southern U.S. logging culture is not enamored with cut-to-length. Changes in everything from bookkeeping to wood yards would need to occur to support a major portion of harvesting shifting to cut-to-length. It is reasonable to believe that this will not happen.

The most commonly utilized harvesting system is the treelength system. For the foreseeable future, this will be the most commonly used system and there are various deficiencies in connection with current treelength harvesting processes and systems. Historically, the treelength system replaced short wood systems which are now almost nonexistent.

Although there are many different configurations of treelength harvesting, most typically follow similar procedures. A representative procedure is as follows. First, the stems are felled and bunched with a drive-to-tree fellerbuncher. Most operations have single fellerbuncher and that machine is usually under-utilized. In other words, it is often idle rather than at work. Next, a grapple skidder skids the felled trees to a delimbing gate. One, two or three skidders are commonly used and they are usually fully utilized. Next the skidder and gater are used to delimb the tree. Gate delimbers are simple and relatively inexpensive to purchase and operate. The skidder then skids the gate delimbed wood to a cold ramp and drops it there. The cold ramp is usually very near the loading ramp and some operations do not even use the cold ramp. At this point chain saws are used to improve the delimbing process and to top the tree at the cold ramp. By topping it is meant that the top portion of the tree, which generally has a diameter smaller than the minimum required by the sawmill, is removed.

The chain saws remain dangerous and create labor problems. A way to end the need for the chain saw is required. This takes labor to accomplish this result and chain saws are a great source of serious injuries even when operated by relatively skilled individuals. The skidder then regrapples the wood and skids it to a loading ramp. Additional chain saw work may be required at the loading ramp. Chain saw work at the loader is more dangerous than the work done at the cold ramp and creates numerous interaction problems.

Finally, a knuckleboom loader is used to load the wood onto trucks for shipment. Generally, most operations have one knuckleboom loader and that loader is usually underutilized. As described above, the skidders are used for many tasks and are also the bottleneck in the processing system. The skidders are used to transport wood, limbs and to dispose of residual materials. Over the long term, fellerbunchers and loaders seldom limit production. The integrated activity of skidding, delimbing and residual handling, all performed by the skidders, is usually the limiting factor.

In addition, delimbing presents a problem with current systems. Three factors contribute to this. Mill specifications for the trees are being better enforced; chain saw work is more expensive; and tree size is falling. Many mills have started understanding the increased cost associated with handling small tops and poorly processed materials. As these mills increase processing quality requirements loggers have more chain saw requirements. As the level of chain saw activity increases system performance decreases because of increased interactions in and around the landing. Chain saw operator availability is limited and costs are high. As the tree size falls with smaller trees there is more processing on a total tonnage basis.

There are several types of mechanical delimbers in use. These include pull-through delimbers which include a set of delimbing knives and a topping saw operated from the loader. The loader places stems in the knife and then pulls them through the knives to the point to be topped. In this operation tops and limbs accumulate around the delimber. This residual is pushed away by the skidder. Most operations, thus, continue to use a gate to minimize the volume of residual that must be dealt with around the loader.

Therefore, the pull-through delimbers displaced the purely chain saw based operations but have only limited improvements on the overall system performance. As a result, the use of track mounted stroke delimbers has grown. The strokes are large machines which utilize boom mounted delimbing knives and a topping saw. The trees are usually delimbed and topped at the cold ramp. A stroke delimber is a major investment for loggers, often in excess of $250,000 and usually can only be used on large, highly productive operations. Most models are difficult to transport between harvest sites. While delimbing quality is generally good and some operations have started using the stroke delimbers to delimb hardwood, there are problems with the current stroke delimbers. Gates are not used and the strokes position residual such that skidders aren't needed for repositioning. These factors improve system performance, but by imposing the cold ramp in the middle of the skidding function, this part of the system is hampered and skidder delays are common. Cold ramps required wood to be grappled two or more times. Interactions with delimbing activity delays skidders and the need to remove residual wood products from the delimbing area uses additional skidder time. Studies have been done to evaluate skidder performance when trees have been delimbed prior to skidding. These studies show large production increases of 30–50% when skidders no longer interact with the delimbing process. This increase can be translated into an overall system productivity increase in most case. Loader performance is also negatively impacted by delimbing interactions. This may increase cost slightly, but because loaders are usually under-utilized, the overall impact is less significant that the impact on skidding.

Delimbing and topping at the landing would be a positive solution if residuals were captured for alternative markets such as fuel. The fuel value of harvest residuals is low. At today's fuel prices there are probably very few situations where the cost of processing, handling and transportation could be covered by the fuel value. At above average haul distances it is likely that more fuel value would be expended in the harvesting process than resides in the actual fiber produced.

By far the largest and almost the only user of forest biomass for fuel is the forest industry. The residuals used at these locations are usually an output of mill processing, most often debarking. Most locations are in an oversupply situation and several place negative values on biomass fuel. Accordingly, it is extremely unlikely that significant increased usage will accrue in the foreseeable future.

Furthermore, since residuals are not captured for fuel, landing area processing causes large piles of residuals to accumulate around the landing. These piles of residuals are unsightly and are usually viewed as waste by the public. Several western states now require loggers to process and distribute harvest residual. This problem is compounded by the fact that landings are often located very near public highways. There are good reasons for this. Less land is taken out of production, less road is utilized, thus less road cost is required and overall negative silvicultural site impacts are reduced when landings are located near highways.

When processing is done at the landing, area requirements go up by a factor of two or three. The most impacted area on a harvest site from an environmental or silvicultural point of view is the landing. If processing is done before skidding, the residual would provide a limited buffer between the soil and the skidder minimizing ground impacts. After harvest the residual would also be better dispersed to provide a filter to reduce soil erosion.

Landing area processing impacts forest nutrition. Table 1 below was developed by Lee Allen with the Forest Nutrition Cooperative at North Carolina State. The study site was a Union Camp plantation in Butler County, Alabama. As the table indicates, harvest residual contains a significant amount of nutrient.

TABLE 1

HARVEST REMOVALS (LBS./ACRE AT 24 YEARS)

|  | STEM ONLY | WHOLE TREE | % INCREASES REMOVALS |
|---|---|---|---|
| BIOMASS | 98,640 | 119,060 | 21 |
| N | 101 | 192 | 90 |
| P | 17 | 28 | 65 |
| K | 67 | 105 | 57 |
| Ca | 97 | 142 | 46 |
| Mg | 26 | 38 | 46 |

Any discussion of harvesting in the Southeast must include plantation thinning. The use of thinning is increasing for several reasons including: there is an increasing number of plantations at thinning age; the difference in value between pulpwood and saw timber is increasing, in part a result of the production shipped from the Northwest to the Southeast; and private land owners are more interested in longer rotations which can provide a wider range of land uses.

Some specialized fitting systems are in use. Most harvesting operations are now required to operate both as clear cuts in which an entire forest is cut and processed and thinning in which only a portion of the forest is selectively removed at any one time. For a system in the Southeast to have wide appeal it needs to be able to do both thinning and clear cut sufficiently. Currently, the most common thinning approach is the removal of every fifth row of tree for an access corridor and the remaining rows having selective removals. The removal of every third row was common several years ago but is currently less favored. In general, as the distance between corridors increases thinning can be more selective. As selection increases stand performance after thinning improves. The proper selection method is from below, that is, cut small trees and leave large ones. The best silvicultural results are obtained at the lowest residual stocking for a given basal area. At close corridor spacings fewer trees are removed from rows with selective treatment. More trees (suppressed trees) have to be left to achieve the basal area needed, because of the number of large trees removed in the corridor. Seventh row and wider corridor spacings allow an approach with purely selective treatments.

High quality silvicultural results can be obtained from treelength thinning systems which utilize seventh row corridor patterns and cut corridors in one pass of the fellerbuncher working from the back to the front along the corridor. This usually requires a three wheeled fellerbuncher. If the fellerbuncher works from front to back trees must be bunched either to the side of the corridor or in the thinned rows, either of which increases residual tree damage and reduces fellerbuncher productivity. An exception to the thinning approach described above exists where thinnings with higher removal rates in which basal areas are reduced to as low as forty feet are utilized. At these low residual basal areas corridor spacing and fellerbuncher patterns are not as critical.

Finally, there have been efforts made to produce treelength harvesters, which is a machine which fells and processes (delimbs and tops) trees. These efforts were unsuccessful for a variety of factors including the substantial cost that these machines required. One of the efforts was a Timberjack TJ30 that utilized a boom-mounted felling head. The boom and head placed the felled tree in a stroke delimbing device on top of the machine. After delimbing the tree dropped into a carrier. When the carrier filled to a skidder drag it was dumped (butt index) to the side of the machine. The felling pattern had to be back to front as described earlier. The applications for the machine were limited because the machine could only handle small trees. Delimbing was also a single stem operation which resulted in low productivity in small trees. Also, the boom limited the machine to third row thinnings which started to fall out of favor about the time the machine came on the market. Finally, the machine had a very high purchase price during a time when small, low capital operations were common.

Another effort was a John Deere 743 machine which also used a boom mounted felling head. Felled trees were placed butt first into a processor device which used feed wheels to pull trees past the delimbing knives. As the tree was processed it passed along side the machine. This machine was also a single stem machine, but could handle a wide range of tree sizes as compared to the Timberjack TJ30. The largest problem was that the machine did not leave trees bunched for skidding. Grapple skidders were starting to become common about the time the machine came on the market. In addition, stem breakage was higher than normal because butt first processing meant the machine had to suspend an entire stem by its small top at the end of each cycle. Another problem was the machine's inability to thin a forest. Finally, the cost was prohibitively high.

Scandinavian harvesters have been utilized which were designed for cut-to-length but are believed to have the same problems as the two other machines and because of the failure to bunch the stems a clambunk skidder was required which would be difficult to introduce into service.

Accordingly, it is difficult to conceive of a treelength harvester which could operate effectively over a wide range of applications. The combination of obstacles to overcome appears to be physically overwhelming. These obstacles include dealing with wide diameter ranges, pre-bunching for skidders and thinning.

Accordingly, there is a need for an improved treelength processing system and machinery for processing trees at or about the felling areas.

SUMMARY OF THE INVENTION

The invention is generally directed to a treelength processor which includes a support for holding the processing equipment, a transport mechanism for moving the treelength processor which is attached to the support. A top cutting mechanism cuts the tree tops at a predetermined tree thickness which is also secured to the support mechanism. A delimbing cutting mechanism is secured to the support for removing limbs from the tree being processed and a tree impeller also secured to the support for gripping and moving the tree to be processed relative to the top cutting mechanism and the delimbing cutting mechanisms.

The invention is also directed to a tree processing system including a fellerbuncher for felling trees, a treelength processor for processing felled trees in a top-first fashion with a stroke delimbing operation without the need for a skidder, a skidder for transporting the processed trees to a loading area and a truck loader for loading the processed logs onto a truck.

It is a further goal of the invention to provide an improved treelength processor which delimbs trees and tops the trees from the top down.

A further goal of the invention is to provide an improved treelength processor which delimbs from the top and incorporates a tree impeller and a fixed delimbing blades in a fashion which reduces the required length of the stroke below the length of the tree.

Still a further goal of the invention is to provide an improved treelength processor which reduces the need to use a chain saw for delimbing.

Yet a further goal of the invention is to provide an improved treelength processor which processes a fairly wide range of tree sizes efficiently from fellerbuncher piles.

Still another goal of the invention is to provide a treelength processor which will leave the process stems prebunched (butt index) for grapple skidders.

Yet still a further goal of the invention is to provide a treelength processor which is capable of operating in a thinning corridor.

Yet another goal of the invention is to provide an improved treelength processor which allows logging contractors to be able to add the machine to an existing system without increasing the per-unit wood cost of the operation.

A still further goal of the invention is to provide an improved treelength processor which operates as a top-first processor in which the trees would be positioned so that the tops could be cut out after the trees have been processed only a few inches, the tops would be pushed and sheared down and under the machine and a stroke cylinder would pull the trees through the delimbing knives and then position the processed tree so that it may fall to one side in a butt indexed pile.

Yet still another goal of the invention is to provide a treelength processing system in which residual materials may be left in skid trails.

Yet a further goal of the invention is to provide a top-first treelength processor for use at a fellerbuncher pile in which less stem breakage occurs and top-first processing allows a smaller, lower horsepower machine to be utilized than bottom-first processing.

Still yet a further goal of the invention is to provide a treelength processor in which delimbing quality when handling multiple trees at one time will be better because of the limb acute angle and delimbing characteristics of southern pine.

Still other objects and advantages of the invention will, in part, be obvious and will, in part, be apparent from the specification.

The invention accordingly comprises the features of construction, combinations of elements and arrangements of parts which will be exemplified in the construction as hereinafter set forth, and the scope of the invention will be indicated in the claims.

BRIEF DESCRIPTION OF THE DRAWINGS

For a fuller understanding of the invention, reference is had to the following descriptions taken in connection with the accompanying drawings, in which.

DETAILED DESCRIPTION OF THE PREFERRED EMBODIMENT

Accordingly, a treelength processor that delimbs and tops felled trees that operate from fellerbuncher piles in accordance with the invention is indicated. The key elements of the treelength processor in accordance with the invention is its ability to process a fairly wide range of tree sizes efficiently from fellerbuncher piles, including multiple processing of small trees. The processor would leave the processed stems pre-bunched (butt index) for grappled skidders, would be capable of operating in a thinning corridor and would allow logging contractors to add the machine to their harvesting system without increasing per-unit wood cost.

The treelength processor constructed in accordance with the invention is a top-first processor. The processor addresses the fellerbuncher piles from the top. A boom grapple is used to position the trees in a processing device. The trees would be positioned so that the tops could be cut out after the trees have been processed only a few inches. The tops would be pushed and sheered down under the machine. Two sets of fixed delimbing knives spaced apart a distance based upon the expected length of the trees would be used. In a preferred embodiment, the two sets of fixed delimbing knives would be twelve feet apart, based upon an expected maximum tree length excluding tops of twenty four feet. A stroke cylinder would pull the trees through the delimbing knives. After the more difficult delimbing is accomplished, feed wheels pull the rest of the trees through and into a position so that it may fall to one side in a butt index pile.

Figure 1:
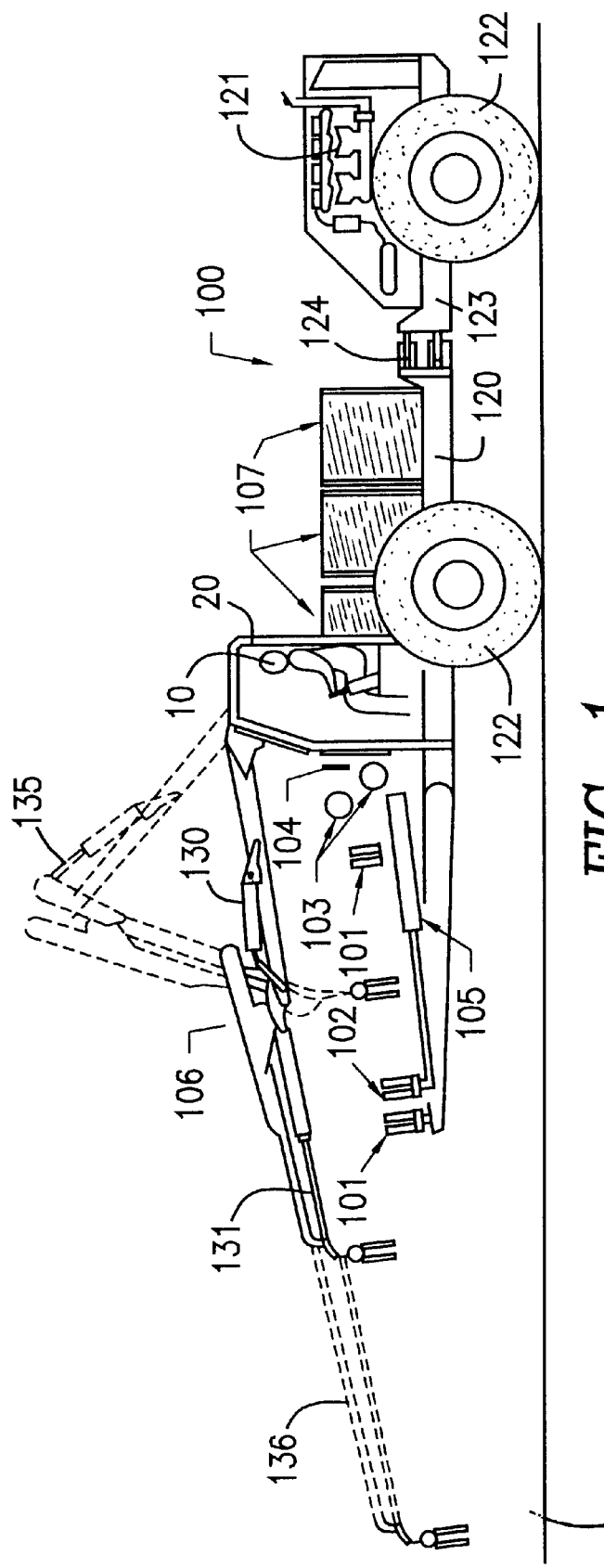
FIG. 1 is a side elevational view of a treelength processor constructed in accordance with a preferred embodiment of the invention.
Figure 2:
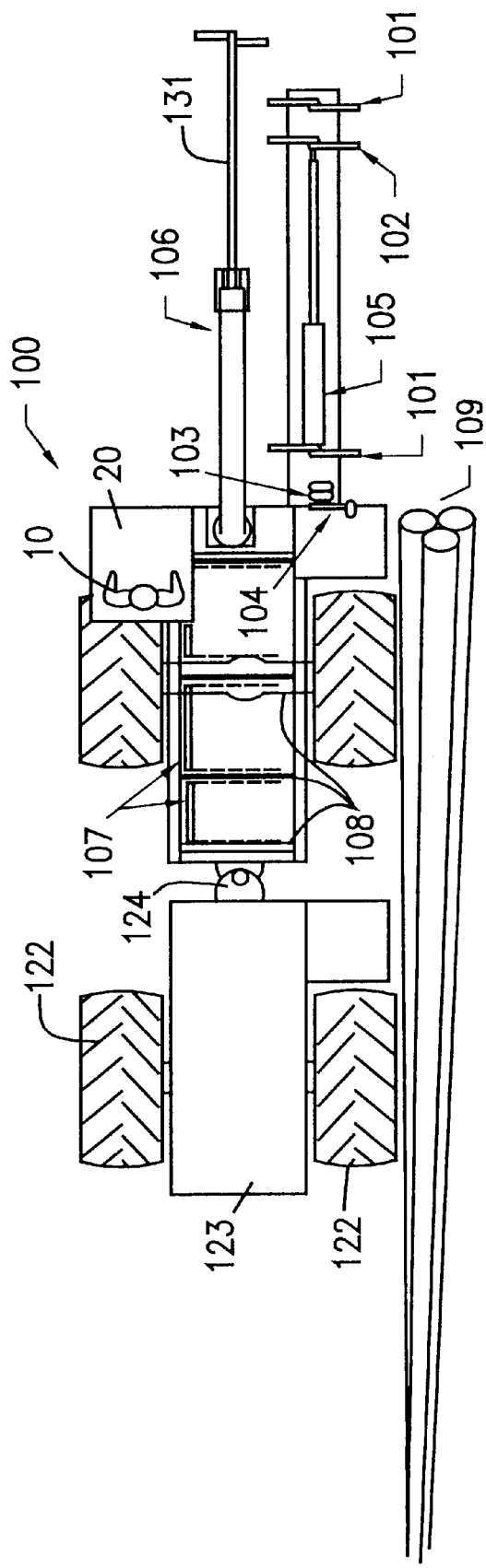
FIG. 2 is a top elevational view of the treelength processor of FIG. 1.

Reference is made to FIGS. 1 and 2, in which a treelength processor, generally indicated as 100, constructed in accordance with a preferred embodiment of the invention is depicted. FIG. 1 is a side elevational view of the treelength processor 100 and FIG. 2 is a top elevational view of treelength processor 100.

Treelength processor 100 includes fixed delimbing knives 101, stroke grapple 102, feed rollers 103, topping device 104, stroke cylinder 105, knuckleboom loader 106, topping arms 107, topping sheer blades 108 (FIG. 2) and processed wood 109. In addition, treelength processor 100 includes a processing chassis 120 which supports topping arms 107, topping sheer blades 108 and operator 10 sitting in a cab 20, as well as knuckleboom loader 106, fixed delimbing knives 101, stroke grapple 102, stroke cylinder 105, feed rollers 103 and topping device 104. In addition, an engine chassis 123, which supports engine 121 is coupled to chassis 120 by coupler 124, which allows a relative rotation of the two parts for increased maneuverability of processor 100 (best seen in FIG. 2).

Knuckleboom loader 106 is shown in the solid lines in a position which the rotation assembly 130 is fully extended and the grappling arm 131 is fully retracted. The dotted lines 135 show the position of the rotation assembly in the fully compressed position and dotted lines 136 show the grappling arm 131 in its fully extended position. Topping arms 107 rotate so as to push the treetop which is trimmed of f using topping device 104 and topping sheer blades 108 underneath the processor 100.

The residual which is removed in the delimbing process falls next to the machine in the path and is, thus, left in the skid trails where it prevents erosion, is useful as nutrient in the area and minimizes the damage to the land by the skidders and other equipment. Because the tree is processed from the top down there is less stem breakage as would be present with the bottom up approach in which the weight of the entire tree would be supported by the narrow top end of the tree. In this case, as the cantilevered portion of the tree increases, the weight is supported by the wider bottom portion of the stem.

In 99% of plantations, merchantable stems cut to a three inch top diameter leaves residual tops that are twelve feet or less in length. The drawings show a configuration to allow a twelve foot top to be cut out and pushed under the machine. The complete processing device could located back and on the machine in this area. This would shorten the machine but increase processing time. The stroke increases the cost and the processing time. Some loggers feel that feed wheels don't provide enough delimbing power. Thus, a processor could be designed without the stroke cylinder.

The processor 100 shown in FIGS. 1 and 2 shows a machine with two sets of delimbing knives. 99% of plantation stems have 24 feet or less of stem to be delimbed after topping. With two sets of fixed knives positioned twelve feet apart a twelve foot stroke would delimb 24 feet. Then, the much faster feed rollers could complete the process. Alternatively, there may be too much sweep in the stems and only one delimbing knife may be necessary.

The processor is shown as a four wheeled machine. In an effort to cut costs a three wheeled machine could be used. In addition, the processing devices might be installed on different types of booms or different types of booms could be used to feed the processor. Most operations which would incorporate the treelength processor constructed in accordance with a preferred embodiment of the invention could reduce the per-unit cost of processing. As reviewed earlier, fellerbunchers and loaders are usually under-utilized. Increasing throughput on these machines will reduce fixed and labor costs. In the case of the loader, variable cost will also be reduced because less handling will be required. Furthermore, skidding cost will be substantially reduced because the skidders will no longer interact with the delimbing operation. Delimbing before skidding also means no more gate delimbing, no regrappling at the cold ramp, no residual to push away and no delays for delimbing interactions. It also allows the skidders to pull larger payloads. Gate delimbing has always created skidder maintenance problems which will also be eliminated. Finally, the chain saw costs will be reduced to an almost insignificant level and the support cost, a fixed item, will be reduced on a per unit basis by the volume increase.

While the cost of owning and operating the processor will likely be significant, its cost will be more than offset by the production increase and the reduced cost in the other areas. While actual processor cost and production rates are unknown and variable depending upon the particular circumstances and conditions, reasonable estimates can be developed. The following tables are a conservative cost estimates for two operations with and without a processor. Assumptions have been made and the most important are shown on the tables. A 20% production increase has been used, but some studies suggest much higher increases in production are possible. Even with these conservative estimates, some small savings are still developed. The true cost will vary greatly by operation, logging chance and geographical area. The Tables 2 and 3 are too simplistic to predict true cost, but are instead a conservative model which still shows the predictive effect of adding a processor to conventional systems.

TABLE 2

ONE SKIDDER SYSTEM

| | | | Purchase Price | Hourly Operating |
|---|---|---|---|---|
| Work Days/Year | 200 | Fellerbuncher | $165,000 | $25 |
| Work Hours/Day | 10 | Skidder | $135,000 | $20 |
| Interest Rate | 10% | Chainsaws | $3,000 | $10 |
| Labor-Dollars/Hour | $10 | Loader | $85,000 | $14 |
| % Fringes | 50% | Processor | $185,000 | $25 |
| Machine Life | 4 | | | |
| Residual Value | 10% | | | |
| Annual Support | $30,000 | | | |
| CONVENTIONAL TREELENGTH 175 TONS | | | TREELENGTH PROCESSOR 210 TONS | |
| Number Units | Hours/Day | Daily Production Rate | Number Units | Hours/Day |
| 1 | 3.4 | Fellerbuncher | 1 | 4.1 |
| 1 | 7.0 | Skidder | 1 | 7.0 |
| 1 | 5.0 | Chainsaw | 1 | 1.0 |
| 1 | 3.4 | Loader | 1 | 4.1 |
| 0 | 0.0 | Processor | 1 | 4.1 |
| Annual | Per Ton | COST | Annual | Per Ton |
| | | Fellerbuncher | | |
| $35,553.00 | $1.02 | Machine Fixed | $35,553.00 | $0.85 |
| $17,000.00 | $0.49 | Machine Variable | $20,400.00 | $0.49 |
| $30,000.00 | $0.86 | Labor | $30,000.00 | $0.71 |
| | $2.36 | | | $2.05 |
| | | Processor | | |
| $0.00 | $0.00 | Machine Fixed | $39,862.00 | $0.95 |
| $0.00 | $0.00 | Machine Variable | $20,500.00 | $0.49 |
| $0.00 | $0.00 | Labor | $30,000.00 | $0.71 |
| | $0.00 | | | $2.15 |
| | | Skidder | | |
| $29,089.00 | $0.83 | Machine Fixed | $29,089.00 | $0.69 |
| $28,000.00 | $0.80 | Machine Variable | $28,000.00 | $0.67 |
| $30,000.00 | $0.86 | Labor | $30,000.00 | $0.71 |
| | $2.49 | | | $2.07 |
| | | Loading | | |
| $18,315.00 | $0.52 | Machine Fixed | $18,315.00 | $0.44 |
| $9,520.00 | $0.27 | Machine Variable | $10,282.00 | $0.24 |
| $30,000.00 | $0.86 | Labor | $30,000.00 | $0.71 |
| | $1.65 | | | $1.40 |
| | | Chainsaws | | |
| $3,000.00 | $0.09 | Machine Fixed | $600.00 | $0.01 |
| $10,000.00 | $0.29 | Machine Variable | $2,000.00 | $0.05 |
| $30,000.00 | $0.86 | Labor | $0.00 | $0.00 |
| | $1.23 | | | $0.06 |
| $30,000.00 | $0.86 | Support | $30,000.00 | $0.71 |

TABLE 3

TWO SKIDDER SYSTEM

| | | | Purchase Price | Hourly Operating |
|---|---|---|---|---|
| Work Days/Year | 200 | Fellerbuncher | $165,000 | $25 |
| Work Hours/Day | 10 | Skidder | $135,000 | $20 |
| Interest Rate | 10% | Chainsaws | $3,000 | $10 |
| Labor-Dollars/Hour | $10 | Loader | $85,000 | $14 |
| % Fringes | 50% | Processor | $185,000 | $25 |
| Machine Life | 4 | | | |
| Residual Value | 10% | | | |
| Annual Support | $45,000 | | | |
| CONVENTIONAL TREELENGTH 300 TONS | | | TREELENGTH PROCESSOR 360 TONS | |
| Number Units | Hours/Day | Daily Production Rate | Number Units | Hours/Day |
| 1 | 5.8 | Fellerbuncher | 1 | 7.0 |
| 2 | 14.0 | Skidder | 2 | 14.0 |
| 2 | 5.0 | Chainsaw | 0 | 1.0 |
| 1 | 5.8 | Loader | 1 | 7.0 |
| 0 | 0.0 | Processor | 1 | 7.0 |
| Annual | Per Ton | COST | Annual | Per Ton |
| | | Fellerbuncher | | |
| $35,553.00 | $0.59 | Machine Fixed | $35,553.00 | $0.48 |
| $29,000.00 | $0.48 | Machine Variable | $34,800.00 | $0.48 |
| $30,000.00 | $0.50 | Labor | $30,000.00 | $0.42 |
| | $1.58 | | | $1.39 |
| | | Processor | | |
| $0.00 | $0.00 | Machine Fixed | $38,862.00 | $0.55 |
| $0.00 | $0.00 | Machine Variable | $35,000.00 | $0.49 |
| $0.00 | $0.00 | Labor | $30,000.00 | $0.42 |
| | $0.00 | | | $1.46 |
| | | Skidder | | |
| $71,577.00 | $1.19 | Machine Fixed | $71,677.00 | $1.90 |
| $56,000.00 | $0.93 | Machine Variable | $86,000.00 | $0.78 |
| $80,000.00 | $1.00 | Labor | $80,000.00 | $0.83 |
| | $3.13 | | | $2.61 |
| | | Loading | | |
| $18,315.00 | $0.31 | Machine Fixed | $18,315.00 | $0.25 |
| $16,240.00 | $0.27 | Machine Variable | $17,539.00 | $0.24 |
| $30,000.00 | $0.50 | Labor | $30,000.00 | $0.42 |
| | $1.08 | | | $0.91 |
| | | Chainsaws | | |
| $6,300.00 | $0.10 | Machine Fixed | $1,260.00 | $0.02 |
| $10,000.00 | $0.17 | Machine Variable | $2,000.00 | $0.03 |
| $80,000.00 | $1.00 | Labor | $0.00 | $0.00 |
| | $1.27 | | | $0.05 |
| $45,000.00 | $0.75 | Support | $45,000.00 | $0.63 |

Several additional advantages of the treelength processor constructed in accordance with the invention is that it would fit within the current system such that a treelength processor could be added to most systems now in operation. In addition, there would be improved safety primarily through the reduction in chain saw operations. Another important factor is the reduction of congestion, especially in a landing area. The system would also provide an improved worker environment with the same factors that create a safer environment also creating a more comfortable and appealing environment. The system would also provide improved quality because mechanical processing has proven itself in the area of delimbing quality and topping at the desired diameter. There would also be improved environment and silvicultural results where the positioning of the residual closer to the stump improves nutrient cycling, reduces soil compaction and erosion and reduces landing size. There would also be improved aesthetics such that the position of residual throughout the stand is more appealing to most people than the current approach which concentrates the residual near the landing area. There would also be a reduction in the cost such that the per unit wood cost would be lower than a conventional treelength system. Finally, the system would reduce wet weather problems such that the positioning of the residual would provide a buffer between the soil and the skidder which would allow the skidder to operate on wetter sites than it can currently.

The invention is also directed to a complete tree harvesting system including a fellerbuncher, a treelength processor in accordance with the invention, a skidder and a truck loader. The fellerbuncher fells the trees and then bunches the trees in a butt indexed fashioned. Next, the treelength processor 100, described above, would delimb and top the logs and leave the processed logs in a pile where the skidder could then easily remove them to a roadside where a truck loader would load the processed trees onto a truck for transportation to a saw mill or other location.

The various delimbing knives, grapples, loader assemblies and other components of the processor 100 are shown in generally schematic views and various types of these devices in accordance with conventional structures may be utilized together in connection with the processor 100.

Accordingly, an improved treelength processor in which top down processing of trees from fellerbuncher piles is accomplished near the stump with residual and top placed under or next to the processing device is provided.

It will thus be seen that the objects set forth above, among those made apparent in the preceding description, are efficiently obtained and, since certain changes may be made in the above constructions without departing from the spirit and scope of the invention, it is intended that all matter contained in the above description or shown in the accompanying drawings shall be interpreted as illustrative, and not in a limiting sense.

It is also to be understood that the following claims are intended to cover all of the generic and specific features of the invention, herein described and all statements of the scope of the invention which, as a matter of language, might be said to fall therebetween.

What is claimed is:

1. A treelength processor, comprising:
   support means for holding a topping and delimbing mechanism;
   transport means for moving the support means, secured to the support means;
   top cutting means for cutting treetops of a tree to be processed to a desired cross-sectional area, secured to the support means;
   delimbing cutting means, secured to the support means for removing limbs from the tree being processed from the top of the tree to the bottom;
   tree impeller means for gripping and moving the tree to be processed relative to the top cutting means and the delimbing cutting means such that the tree is processed from the top to the bottom.

2. The treelength processor of claim 1 wherein the top cutting means includes a cutting mechanism for cutting the top of the tree being processed and topping arms for pushing the top of the tree under the treelength processor.

3. The treelength processor of claim 1 wherein the delimbing cutting means includes two sets of delimbing knives which are spaced apart a distance equal to about one half of the maximum length of a portion of the tree requiring delimbing.

4. The treelength processor of claim 1 wherein the tree impeller means includes a stroke grapple.

5. The treelength processor of claim 1 wherein the tree impeller means includes feed rollers.

6. The treelength processor of claim 4 wherein the tree impeller means includes feed rollers.

7. The treelength processor of claim 1 wherein the treelength processor includes a loading means for lifting the tree to be processed onto the treelength processor.

8. The treelength processor of claim 1 wherein the tree limb cutting means is capable of delimbing more than one tree at a time.

9. A tree harvesting system comprising:
   a fellerbuncher for felling trees;
   a treelength processor for topping and delimbing trees form the top down from the felled trees; said treelength processor comprising
   support means for holding a topping and delimbing mechanism;
   transport means for moving the support means, secured to the support means;
   top cutting means for cutting treetops of a tree to be processed to a desired cross-sectional area, secured to the support means;
   delimbing cutting means, secured to the support means for removing limbs from the tree being processed from the top of the tree to the bottom;
   tree impeller means for gripping and moving the tree to be processed relative to the top cutting means and the delimbing cutting means such that the tree is processed from the top to the bottom.

* * * * *